2,878,245

NORLEUCINE DERIVATIVES AND PROCESS FOR PRODUCING SAME

Alexander M. Moore, Grosse Pointe Farms, and Horace A. De Wald, Grosse Pointe Woods, Mich., assignors to Parke, Davis & Company, Detroit, Mich., a corporation of Michigan No Drawing. Application January 15, 1958
Serial No. 708,970

9 Claims. (Cl. 260—239)

This application is a continuation-in-part of our copending applications Serial Number 530,486, filed August 25, 1955, and Serial Number 570,418, filed March 9, 1956, and the invention relates to a process for producing 6-diazo-5-oxonorleucines and to certain intermediate oxazolidine-2,5-diones produced in said process.

In accordance with the invention 6-diazo-5-oxonorleucines which have the formula,

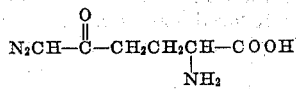

are produced by subjecting a γ-benzyl-N-carboxyglutamate anhydride to hydrogenation to obtain the corresponding N-carboxyglutamate anhydride, treating the N-carboxyglutamate anhydride with a halogenating agent to obtain the corresponding 4-halocarbonylethyloxazolidine-2,5-dione, reacting the latter product with diazomethane to obtain 4-(4-diazo-3-oxobutyl)oxazolidine-2,5-dione, hydrolyzing latter oxazolidine-2,5-dione and neutralizing the hydrolytic product. These transformations can be illustrated as follows:

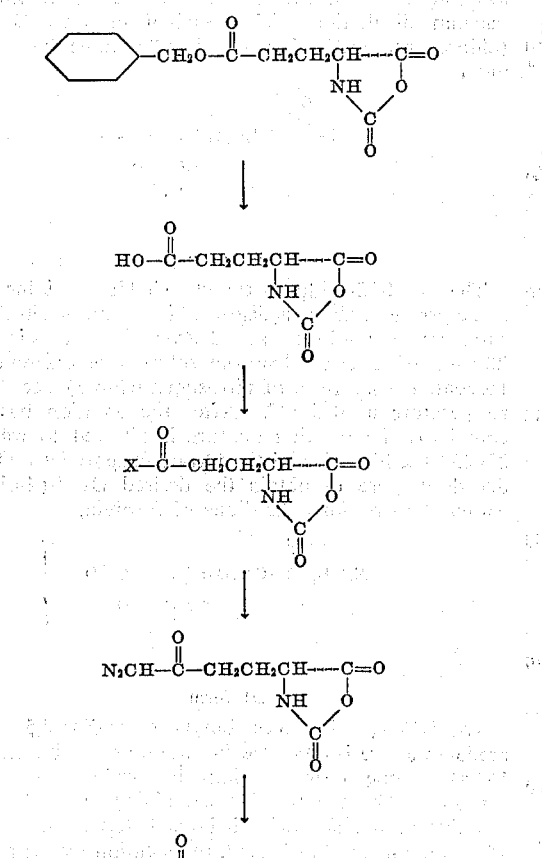

where X is a chlorine or bromine atom.

From the formulas given above it will be seen that the 6-diazo-5-oxonorleucine exists in the optically active D and L forms as well as the optical racemic DL form and that the same is true of the intermediate products and starting products used in the preparation of these substances. It is to be understood that the formulas throughout the specification and claims, in the absence of a designation to the contrary, represent the D-optical isomer, the L-optical isomer or the DL-optically inactive form of the chemical compounds. The same convention, in the absence of a designation to the contrary, is to be applied to the chemical names appearing in the specification and claims. Thus, where a chemical name does not specify which optical form is intended, the name is to be interpreted in its generic sense, that is, as meaning either the D-optical isomer, the L-optical isomer or the optically racemic DL-form.

The hydrogenation step of the process is carried out at room temperature or above using gaseous hydrogen and a noble metal catalyst such as palladium. The reaction is preferably carried out at a temperature in the range from 25 to 80° C. Hydrogen pressure is maintained during the reaction in the range from 10 to 60 pounds per square inch. Greater hydrogen pressures are ordinarily unnecessary. An inert organic solvent, for example, an alkyl ester of a lower fatty acid such as ethyl acetate or a cyclic ether such as dioxane or tetrahydrofuran, is ordinarily employed for the reaction.

In converting the N-carboxyglutamate anhydride to 4-halocarbonylethyloxazolidine-2,5-dione at least one equivalent of a halogenating agent such as thionyl chloride, phosphorus trichloride or pentachloride, phosphorus tribromide or pentabromide, etc., is employed. The reaction is conveniently accomplished by mixing the halogenating agent and N-carboxyglutamate anhydride together, preferably at moderately elevated temperature. While ordinarily unnecessary, an organic solvent such as benzene can be employed if desired.

The reaction between the 4-halocarbonylethyloxazolidine-2,5-dione and diazomethane is carried out in the cold, that is, below 20° C. and preferably in the range of —5 to 10° C., in an inert organic solvent. At least two equivalents of diazomethane are employed. Hydrocarbons such as benzene, toluene and the like, lower aliphatic ethers, cyclic ethers such as dioxane, tetrahydrofuran and the like, can be employed as solvents.

The hydrolysis of the resultant 4-(4-diazo-3-oxobutyl)-oxazolidine-2,5-dione to 6-diazo-5-oxonorleucine is carried out in water alone, or in an aqueous medium under alkaline conditions, below 30° C. As alkaline agents, alkali metal or alkaline earth metal hydroxides, carbonates, bicarbonates, oxides, alkoxides, amides and the like, can be employed. Preferably, a dilute solution, containing approximately one equivalent of an alkali metal hydroxide such as sodium hydroxide or potassium hydroxide is employed at a temperature in the range from —5 to 10° C. The reaction ordinarily takes place almost immediately at 5° C. When the hydrolysis is complete, the reaction mixture is neutralized with acid at room temperature or below. For this purpose, a mineral acid such as hydrochloric, hydrobromic, sulfuric or phosphoric acid may be employed. Neutralization is accomplished by carefully lowering the pH into the range of 5.5 to 7, the range of 6 to 6.5 being preferred.

The 6-diazo-5-oxonorleucines produced by the process of the invention possess phytotoxic and other interesting properties. They are particularly useful as herbicides, deweeding agents and the like. For this purpose, a dilute aqueous solution is employed and the solution applied to the plant or plant crop in accordance with methods which are known in the art. The compounds are effective in high dilution and in addition have a selective action against certain undesirable weed species. For example, in the case of L-diazo-5-oxonorleucine, an aqueous solution at a concentration of 1,000 parts per million applied in a spray to the point of drip off to separate vigorously growing test plots of lambsquarter and pigweed gives 100% kills whereas the growth of a comparable plot of corn is inhibited to the extent of only 20% under identical conditions. The 4-(4-diazo-3-oxybutyl)oxazolidine-2,5-diones with which this invention is concerned are useful as intermediates for the production of 6-diazo-5-ozonorleucines. The method of converting these compounds to 6-diazo-5-oxonorleucines has been described in detail above.

The invention is illustrated by the following examples:

Example 1

2.6 g. of γ-benzyl-N-carboxy-L-glutamate anhydride is dissolved in 60 ml. of anhydrous ethyl acetate, 0.6 g. of 10% palladium on charcoal is added to the solution and the mixture shaken at room temperature for one hour with hydrogen under a pressure of 40–60 lbs. per square inch. When the reaction is complete, the catalyst is removed by filtration and the solvent evaporated from the filtrate under reduced pressure. The residual product, N-carboxy-L-glutamate anhydride, has the formula

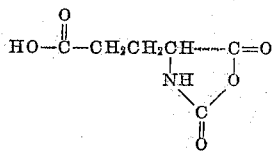

L-form

The N-carboxy-L-glutamate anhydride prepared above is suspended in 15 ml. of thionyl chloride and warmed gently for fifteen minutes to obtain a clear yellow solution. The excess thionyl chloride is removed by vacuum distillation. The residual product, L-4-[2-(chlorocarbonyl)ethyl]oxazolidine-2,5-dione, has the formula

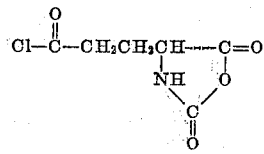

L-form

The L-4-[2-(chlorocarbonyl)ethyl]oxazolidine-2,5-dione prepared above is dissolved in 20 ml. of tetrahydrofuran and the solution is added drop-wise with stirring to a solution of diazomethane (prepared from 7 g. of nitrosomethylurea) in 100 ml. of tetrahydrofuran at 0–5° C. The reaction mixture is allowed to warm to 23–25° C., filtered, and then the filtrate concentrated under reduced pressure to obtain L-4-(4-diazo-3-oxobutyl)oxazolidine-2,5-dione which has the formula

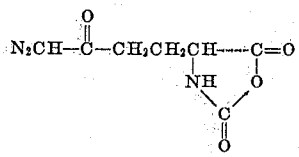

L-form

The L-4(4-diazo-3-oxybutyl)oxazolidine-2,5-dione prepared above is dissolved in 30 ml. of water containing 8 ml. of one normal sodium hydroxide at room temperature. As soon as solution occurs, the pH is adjusted to 6.5 with dilute hydrochloric acid, the solution frozen and the ice sublimed from the frozen mass under high vacuum. One gram of the residual solid is dissolved in approximately 40 ml. of water containing 1% acetone and the solution is passed through an adsorption column containing 90 g. of activated charcoal and 90 g. of diatomaceous earth. The column is washed and developed with approximately 2.5 hold-up volumes of 1% aqueous acetone and the eluate is collected in 10 ml. fractions. The three fractions showing the strongest ultraviolet absorption at 275 millimicrons are frozen and the ice is sublimed from the frozen mass under high vacuum. The residual solid, L-6-diazo-5-oxonorleucine, is recrystallized from absolute ethanol containing a few drops of water. Optical rotation $[\alpha]_D^{26} = +21°$ (5.4% in water). Ultraviolet maxima in phosphate buffer at pH7:

$$E_{1\,cm.}^{1\%} = 683$$

at 274 millimicrons and $$E_{1\,cm.}^{1\%} = 376$$

at 244 millimicrons.

Example 2

5.2 g. of γ-benzyl-N-carboxy-DL-glutamate anhydride is dissolved in 120 ml. of anhydrous ethyl acetate, 1.2 g. of 10% palladium on charcoal is added to the solution and the mixture shaken at room temperature for one hour with hydrogen under a pressure of 40–60 lbs. per square inch. When the reaction is complete, the catalyst is removed by filtration and the solvent evaporated from the filtrate under reduced pressure. The residual product, N-carboxy-DL-glutamate anhydride, has the formula,

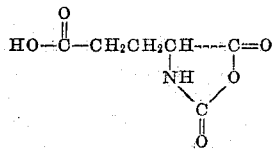

DL-form

The N-carboxy DL-glutamate anhydride prepared above is suspended in 30 ml. of thionyl chloride and warmed gently for fifteen minutes to obtain a clear yellow solution. The excess thionyl chloride is removed by vacuum distillation. The residual product, DL-4-[2-(chlorocarbonyl)ethyl]oxazolidine-2,5-dione, has the formula,

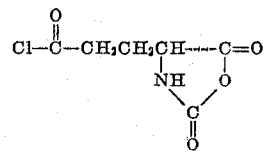

DL-form

The DL-4-[2-(chlorocarbonyl)ethyl]oxazolidine-2,5-dione prepared above is dissolved in 40 ml. of tetrahydrofuran and the solution added drop-wise with stirring to 200 ml. of a tetrahydrofuran solution of diazomethane (prepared from 14 g. of nitrosomethylurea) keeping the temperature at 0–5° C. After the addition has been completed the reaction mixture is allowed to warm to 23–25° C., filtered, and the filtrate evaporated under reduced pressure to obtain the desired DL-4-(4-diazo-3-oxobutyl)oxazolidine-2,5-dione of formula,

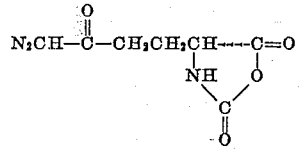

DL-form

The DL-4-(4-diazo-3-oxobutyl)oxazolidine-2,5 - dione prepared above is dissolved in 60 ml. of water containing 16 ml. of one normal sodium hydroxide at room temperature. The PN solution containing the sodium salt of 6-diazo-5-oxonorleucine is immediately adjusted to 6.5 with dilute hydrochloric acid, the solution frozen and the ice sublimed from the frozen mass under high vacuum. Three grams of the residual solid is dissolved in approximately 125 ml. of water containing 1% acetone and the solution passed through an adsorption column containing 270 g. of activated charcoal and 270 g. of diatomaceous earth. The column is washed and developed with approximately 2.5 hold-up volumes of 1% aqueous acetone and the eluate collected in 30 ml. fractions. The fractions showing the strongest ultraviolet absorption at 275 millimicrons are frozen and the ice sublimed from the frozen mass under high vacuum. The residual solid, DL-6-diazo-5-oxonorleucine, is recrystallized from absolute ethanol containing a few drops of water; ultraviolet absorption maxima in phosphate buffer at pH 7:

$$E_{1\ cm.}^{1\%} = 683$$

at 274 millimicrons and $$E_{1\ cm.}^{1\%} = 376$$

at 244 millimicrons.

The γ-benzyl-N-carboxyglutamate anhydrides used as starting materials can be prepared by the method described in J. Am. Chem. Soc. 76, 4492 (1954).

We claim:

1. A compound of formula,

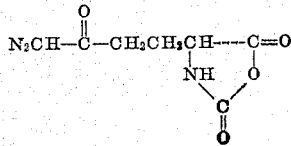

2. L-4-(4-diazo-3-oxobutyl)oxazolidine-2,5-dione.

3. DL-4-(4-diazo-3-oxobutyl)oxazolidine-2,5-dione.

4. Process for the production of 6-diazo-5-oxonorleucine which comprises subjecting γ-benzyl-N-carboxyglutamate anhydride to hydrogenation, reacting the resulting N-carboxyglutamate anhydride with a halogenating agent, reacting the resulting 4-halocarbonylethyloxazolidine-2,5-dione with diazomethane, hydrolyzing the resulting 4-(4-diazo-3-oxobutyl)-oxazolidine-2,5-dione and neutralizing the product of hydrolysis.

5. Process according to claim 4 wherein hydrogenation is accomplished with a noble metal catalyst at a hydrogen pressure of 10 to 60 pounds per square inch.

6. Process according to claim 4 wherein at least one equivalent of a halogenating agent is employed.

7. Process according to claim 4 wherein at least two equivalents of diazomethane are employed at a temperature below 20° C. in an inert organic solvent.

8. Process according to claim 4 wherein the hydrolysis is carried out in an aqueous medium at a temperature below 30° C.

9. Process according to claims 4 and 8 wherein the hydrolysis is carried out in an alkaline medium and the pH of the solution adjusted to 5.5 to 7.

No references cited.